(12) United States Patent
Andoh et al.

(10) Patent No.: US 7,113,317 B2
(45) Date of Patent: Sep. 26, 2006

(54) POLYGON MIRROR SCANNER HAVING AN EASILY REPLACEABLE BEARING

(75) Inventors: Fumikata Andoh, Atsugi (JP); Hideki Konno, Atsugi (JP); Shinobu Kanatani, Atsugi (JP); Yasuhiro Aridome, Aikou-gun (JP)

(73) Assignee: Ricoh Company, Ltd., Tokyo (JP)

( * ) Notice: Subject to any disclaimer, the term of this patent is extended or adjusted under 35 U.S.C. 154(b) by 113 days.

(21) Appl. No.: 10/665,551

(22) Filed: Sep. 22, 2003

(65) Prior Publication Data

US 2004/0057093 A1   Mar. 25, 2004

(30) Foreign Application Priority Data

Sep. 20, 2002   (JP)   ............... 2002-276265

(51) Int. Cl.
*G02B 26/08* (2006.01)
(52) U.S. Cl. ........................... 359/198; 310/90
(58) Field of Classification Search ........ 359/216–218, 359/199–201; 310/90
See application file for complete search history.

(56) References Cited

U.S. PATENT DOCUMENTS 6,145,377 A * 11/2000 Nakasugi et al. ............. 73/483
6,175,439 B1   1/2001 Ozaki et al.
6,201,624 B1   3/2001 Ozaki et al.
6,217,684 B1   4/2001 Morii et al.
6,224,709 B1   5/2001 Takemoto et al.
6,435,241 B1   8/2002 Morii et al.
6,471,801 B1  10/2002 Takemoto et al.
6,503,358 B1   1/2003 Takemoto et al.
6,544,376 B1   4/2003 Takemoto et al.
6,575,221 B1   6/2003 Morii et al.

FOREIGN PATENT DOCUMENTS

JP       2000-041359       8/2000

* cited by examiner

*Primary Examiner*—Euncha P. Cherry
(74) *Attorney, Agent, or Firm*—Oblon, Spivak, McClelland, Maier & Neustadt, P.C.

(57) ABSTRACT

A polygon mirror scanner is disclosed, comprising a rotor having a rotating shaft, a polygon mirror having a regular prism and having a mirror surface on each side thereof, and a magnet; a bearing device, rotatably bearing the rotor, having a radial bearing, a thrust bearing, and a stator yoke; and a stator having a coil facing the magnet with a predetermined distance therebetween, wherein the radial bearing and the thrust bearing are exchangeable at the end of their useful life while maintaining a desired level of high precision and tolerances for proper and efficient operation of the polygon mirror scanner.

20 Claims, 4 Drawing Sheets

POLYGON MIRROR SCANNER HAVING AN EASILY REPLACEABLE BEARING

This document claims priority and contains subject matter related to Japanese Patent Application No. 2002-276265 filed on Sep. 20, 2002, incorporated herein by reference.

BACKGROUND OF THE INVENTION

1. Field of the Invention

The present invention relates to a polygon mirror scanner for light writing for use in digital copiers, page printers, and the like.

2. Discussion of the Background

FIG. 4 is a schematic view illustrating a cross section of a conventional polygon mirror scanner. A rotary polygon mirror 1 has a disc-shaped plane polygon (an equilateral hexagon in FIG. 4), a cylindrical rotor 3 below the rotary polygon mirror 1, a head 1a above the rotary polygon mirror 1 in the center thereof and six side faces 1b on the periphery of the rotary polygon mirror 1.

The six side faces 1b on the periphery of the rotary polygon mirror 1 are mirror-finished smooth light reflection faces (mirror faces). The center of the head 1a, i.e., a center of gravity of the equilateral hexagon, has a hole, where a rotating shaft 2 fitted to the rotary polygon mirror 1 is inserted. In addition, the rotating shaft 2 has a curved surface at both ends thereof.

A magnet 4 has a cylindrical shape having an outer diameter which is almost equal to an inner diameter of the rotor 3, and is fixed inside the rotor 3 so as to be concentric with the rotating shaft 2 to form a rotor 10 for the polygon mirror scanner.

A bearing device 20, supporting the rotating shaft 2 of the rotor 10, includes a radial bearing 21, supporting the rotating shaft 2, a thrust bearing 22, receiving a thrust load of the rotating shaft 2, and a stator yoke 23, supporting the radial bearing 21. The radial bearing 21 is formed of a slide bearing, such as a bearing including an oil, and fixed by being pressed into or bonded to an inner circumferential surface of the stator yoke 23.

The thrust bearing 22 is formed of a slide bearing, e.g., a resin plate such as polyimide having good slidability and abrasion resistance, and fixed by being pressed into or bonded to a concave part on the bottom of the inner circumferential surface of the stator yoke 23. The bearing device 20 is vertically fixed to a plane surface of a control base plate 32, and a coil 31 is fixed on a peripheral surface of the bearing device 20 to form a stator 30.

The coil 31 may be fixed on the control base plate 32. In addition, a peripheral cylindrical surface of the coil 31 faces a peripheral cylindrical surface of the inner circumferential and cylindrical surface of the magnet 4, while maintaining a predetermined clearance. Electricity from the control base plate 32 to the coil 31 drives the rotary polygon mirror 1 to rotate around the rotating shaft 2.

Conventionally, a rotary polygon mirror for use in a polygon mirror scanner for copiers, and like devices is constituted of a flat member having a mirror finished surface on its circumference. The mirror finished rotary polygon mirror is assembled with a rotor and a magnet to form a rotor for a scanner motor, i.e., a rotor for the polygon mirror scanner. The rotary polygon mirror is assembled with a rotating shaft, a rotor yoke, and a magnet to form a rotor for the polygon mirror scanner.

A stator works as a motor driving the rotary polygon mirror to rotate a scanning light beam, wherein a coil is arranged facing the magnet installed in the rotor with a predetermined space and a rotating shaft of the rotor is supported on a base plate on which a controller switching an energizing level of the coil is located.

Due to recent increasing environmental concerns, it is essential that electrical and mechanical products are reused and recycled. Therefore, individual components for digital copiers, page printers, and other similar devices need to be reused and recycled.

It has been said that a rotating shaft and a bearing for a polygon mirror scanner for light writing for use in the digital copiers, page printers, and the like can only be reused as a recycled metallic material or disposed of because, over time, they cannot avoid abrasion and damage due to their extended use.

However, a rotor including a rotary polygon mirror of a polygon mirror scanner for light writing, a rotating shaft, a rotor and a magnet in a body has less abrasion and damage of the rotating shaft due to its extended use. On the other hand, the bearing cannot avoid abrasion and damage due to its extended use.

Therefore, when the bearing comes to the end of its useful life, the polygon mirror scanner has to be exchanged as an assembly, although some of its components are still in a good and useful condition. In addition, a precise modification of the rotary polygon mirror of the rotor requires a significant amount of time and energy; therefore, the rotary polygon mirror has to be reused.

Japanese Laid-Open Patent Publication No. 2000-41359 discloses a method of removing only a rotating shaft from a motor frame and recycling other members thereof.

In the above-mentioned conventional polygon mirror scanner for light writing, the bearing is abraded by a contact of the rotating shaft when the rotation stars and stops because the rotating shaft, which is a center of rotation, is formed of a material harder than that of the bearing.

In addition, over an extended period of use, the rotational load deteriorates as a result of, as for example, a loss in lubrication. In these situations, the polygon mirror scanner takes longer to reach a stable rotational high-speed and experiences operational difficulties, including an irregular rotation and difficulty in maintaining a desired high-speed. These operational problems result in an increase of electric power consumption and a reduction in efficiency of the polygon scanner mirror.

Therefore, when the bearing comes to the end of its useful life, the polygon mirror scanner is exchanged as an assembly although some of its components have not come to the end of their useful lives, resulting in the unnecessary replacement of the good components.

In addition, it is not possible to replace the bearing without replacing the stator yoke into which the bearing is pressed, resulting in alteration and/or loss of the required high vertical precision or tight tolerances between the stator yoke to and the bottom surface of the motor circuit board due to current repair methods, thus, it becomes difficult to reach the needed high rotational speed and desired high efficiency for the polygon mirror scanner.

For at least the foregoing reasons, a need exists for a polygon mirror scanner having a bearing that can be easily replaced at the end of its useful life, while continuing to use other components in the mirror assembly that are still in good operating condition and maintaining the required high precision and tight tolerances for proper and efficient operation of the mirror assembly.

SUMMARY OF THE INVENTION

Accordingly, an object of the present invention is to provide a polygon mirror scanner having a bearing that is easily exchangeable at the end of its useful life while maintaining a desired level of high precision and tolerances for efficient operation of the polygon mirror scanner.

Briefly, this, and other objects of the present invention, as hereinafter will become more readily apparent, can be attained by a polygon mirror scanner comprising:
a rotor, comprising:
  a polygon mirror having a mirror surface on each aspect of a regular prism; and
  a magnet
a bearing device bearing the rotor so as to be rotatable, the bearing device comprising:
  a radial bearing;
  a thrust bearing; and
  a stator yoke, and
a stator, comprising:
  a coil facing the magnet with a predetermined distance therebetween,
wherein the radial bearing and the thrust bearing are exchangeable.

These and other objects, features, and advantages of the present invention will become apparent upon consideration of the following description of the preferred embodiments of the present invention taken in conjunction with the accompanying drawings.

BRIEF DESCRIPTION OF THE DRAWINGS

Various other objects, features, and attendant advantages of the present invention will be more fully appreciated as the same becomes better understood from the detailed description when considered in connection with the accompanying drawings in which like reference characters designate like corresponding parts throughout and wherein.

DETAILED DESCRIPTION OF THE INVENTION

Generally, the present invention provides a polygon mirror scanner having a bearing that is easily replaced at the end of its useful life while maintaining a desired level of high precision and tolerances for efficient operation of the polygon mirror scanner.

Figure 1:
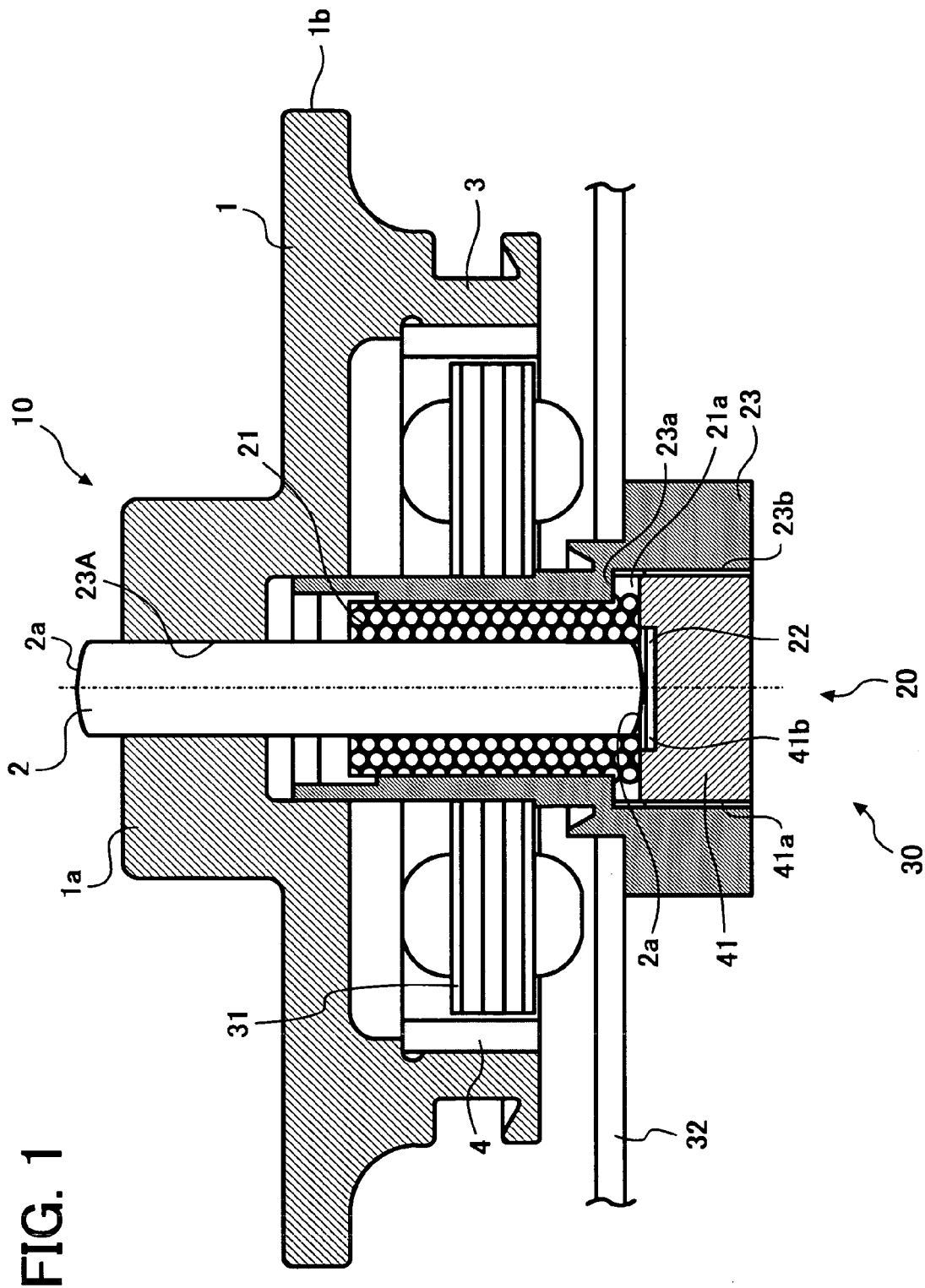
FIG. 1 is a schematic view illustrating a cross section of an embodiment of the polygon mirror scanner of the present invention.
Figure 4:
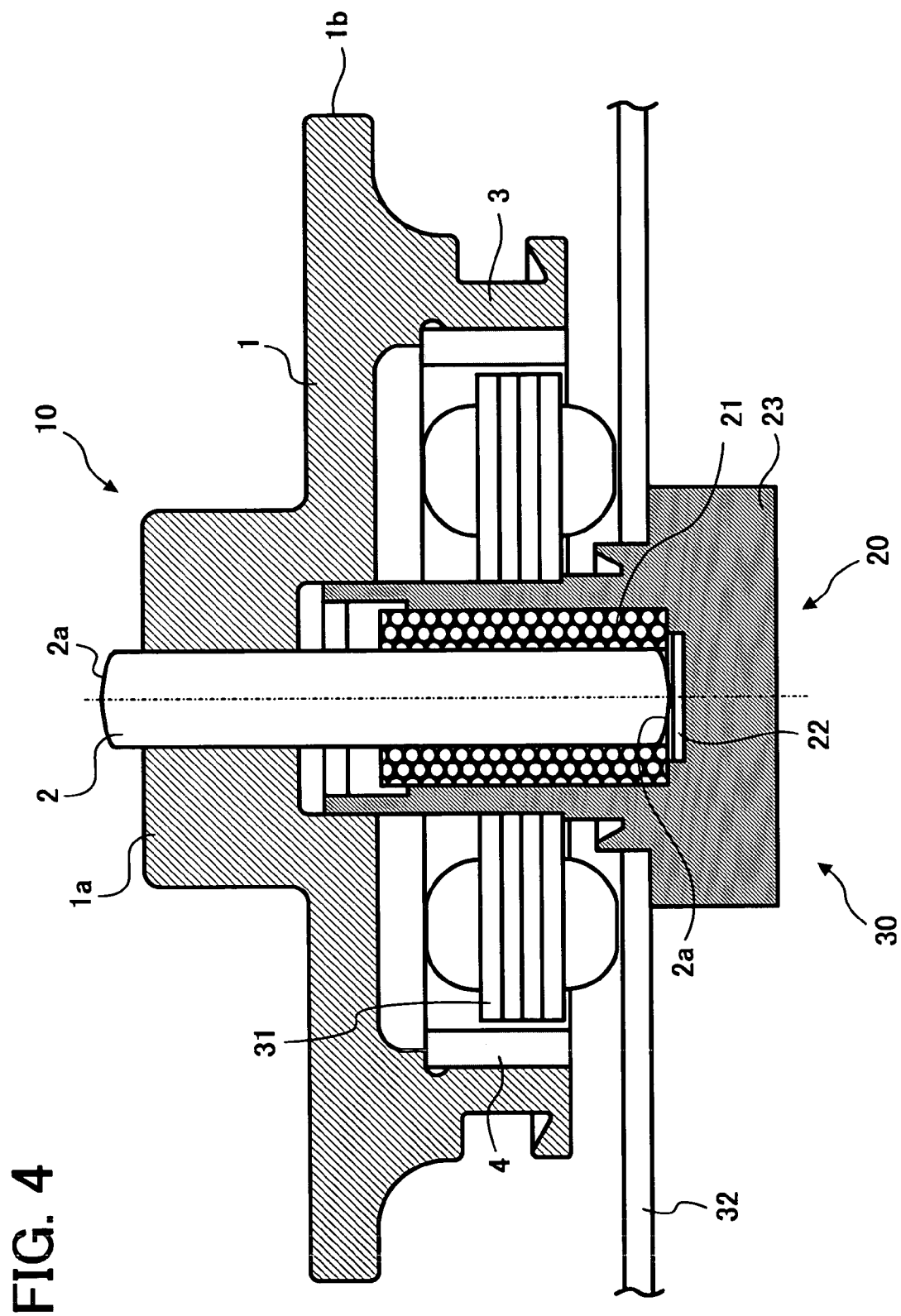
FIG. 4 is a schematic view illustrating a cross section of a conventional polygon mirror scanner.

Hereinafter, an embodiment of the present invention will be explained in detail, referring to the drawings. In FIG. 1, like components have the same numerals as those of the conventional polygon mirror described above in FIG. 4.

A bearing device 20 has a convex cylindrical shape, including a stator yoke 23 having a cylindrical central hole concentrically and axially with a rotating shaft 2 and forming an inner circumferential screw 23b below, a radial bearing 21 having a cylindrical central hole concentrically and axially with a rotating shaft 2 and forming a collar 21a on a peripheral surface thereof in a body and a cylindrical fixing screw 41 fixing the radial bearing 21.

In addition, a peripheral screw 41a is formed on a peripheral surface of the fixing screw 41, and a top surface thereof has a thrust groove 41b on which a thrust bearing 22 is fixed.

The radial bearing 21 is inserted into the cylindrical central hole 23A which is formed in the stator yoke 23 and concentrically and axially with the rotating shaft 2 from beneath. A top surface (standard portion) of the collar 21a formed with the radial bearing 21 in a body is contacted with a standard surface 23a (standard portion) formed on an inner circumferential surface of the stator yoke 23 to fix the radial bearing 21 vertically to a control base plate 32.

In the present invention, bearings 21 and 22 are detachable from the stator yoke 23. In addition, the bearings 21 and 22 are fixed by screwing the peripheral screw 41a into a female screw of the stator yoke 23 after being inserted into the central hole 23A therein.

Figure 2:
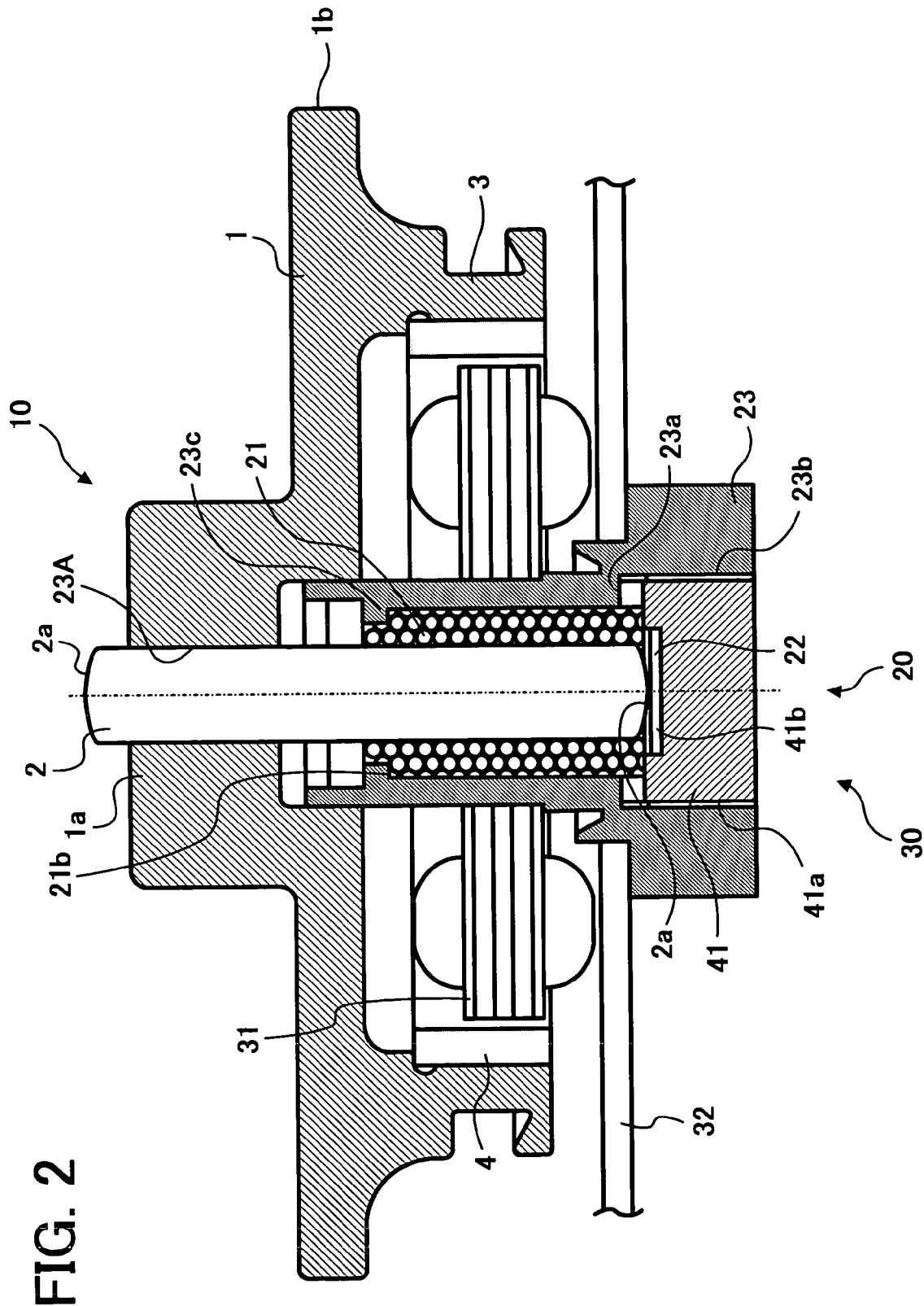
FIG. 2 is a schematic view illustrating a cross section of a modified embodiment of the radial bearing in the embodiment of the polygon mirror scanner in FIG. 1.

FIG. 2 is a schematic view illustrating a cross section of a modified embodiment of the radial bearing in the embodiment of the polygon mirror scanner in FIG. 1. As FIG. 2 shows, an upside standard portion 21b of the radial bearing 21 is contacted with an inner circumferential standard 23c on an upside inner circumferential surface of the stator yoke 23 to fix the radial bearing 21 vertically to a control base plate 32.

A thrust bearing 22 is fixed on a thrust groove 41b formed on a top surface of a fixing screw 41 by being pressed or adhered to the thrust groove 41b. The radial bearing 21 is fixed by screwing the fixing screw 41 into a cylindrical inner circumferential screw 23b formed on the bottom of the stator yoke 23.

Figure 3:
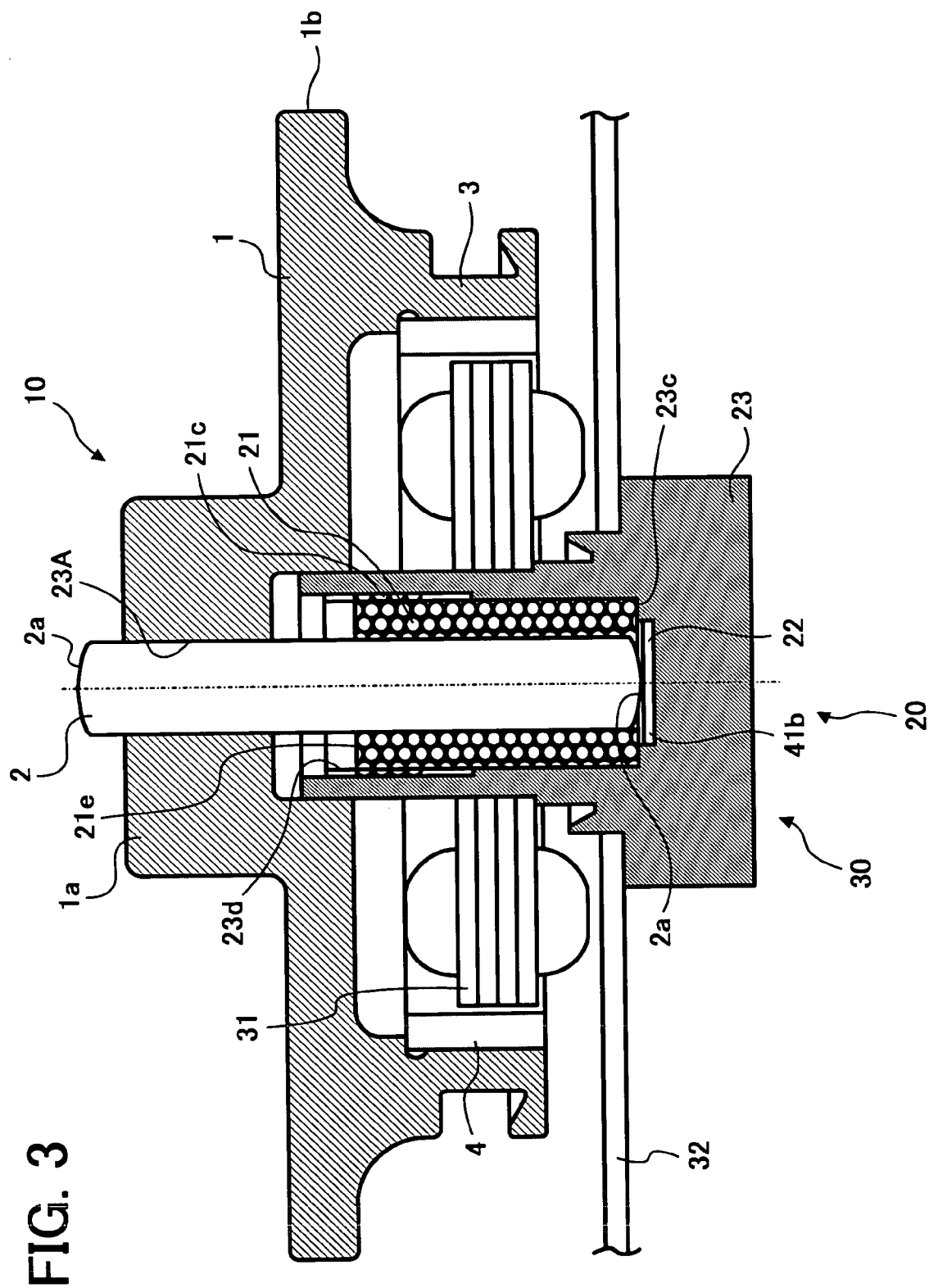
FIG. 3 is a schematic view illustrating a cross section of another embodiment of the polygon mirror scanner of the present invention.

FIG. 3 is a schematic view illustrating a cross section of another embodiment of the polygon mirror scanner of the present invention.

A bearing device 20, having a convex cylindrical shape, comprises a stator yoke 23, having a cylindrical central hole concentrically and axially with a rotating shaft 2 and forming a circumferential bearing building screw 23d on top and a thrust groove 41b on the bottom; a radial bearing, having a cylindrical central hole concentrically and axially with a rotating shaft 2 and forming a circumferential bearing screw 21c on a peripheral surface thereof on top and a building groove 21e on a top surface thereof; and a thrust bearing 22 fixed on the thrust groove 41b.

The radial bearing 21 is inserted into the cylindrical central hole, which is formed in the stator yoke 23 and concentric and axial with the rotating shaft 2 from above. The radial bearing 21, forming the bearing screw 21c, is screwed into the cylindrical bearing building screw 23d (inner circumferential screw) until the radial bearing 21 is contacted with a bearing stopper 23c. Thus, the radial bearing 21 can be vertically fixed to a control base plate 32. In addition, the building groove 21e on a top surface of the radial bearing 21 is a tool groove when the radial bearing 21 is screwed into the inner circumferential screw 23d. When the screws 21c and 21d formed on the radial bearing is screwed into the screw 23d formed on the stator yoke 23, the radial bearing 21 is easily detachable with the stator yoke 23.

Having now fully described the invention, it will be apparent to one of ordinary skill in the art that many changes and modifications can be made thereto without departing from the spirit and scope of the invention as set forth in the claims herein.

What is claimed as new and desired to be secured by Letters Patent of the United States is:

1. A polygon mirror scanner, comprising:
   a rotor comprising a rotating shaft, a polygon mirror having a regular prism and a mirror surface on each side thereof, and a magnet;
   a bearing device rotatably bearing the rotor, the bearing device comprising a radial bearing, a thrust bearing, and a stator yoke; and
   a stator comprising a coil facing the magnet with a predetermined distance therebetween, wherein the radial bearing and the thrust bearing are each separately replaceable.

2. The polygon mirror scanner of claim 1, wherein the radial bearing is fixed with a fixing member.

3. The polygon mirror scanner of claim 1, wherein the radial bearing further comprises a screw groove on a peripheral surface thereof.

4. The polygon mirror scanner of claim 2, wherein the fixing member is configured to attach to the stator yoke by a screw groove on a peripheral surface of the fixing member to facilitate the replacement of the radial bearing.

5. The polygon mirror scanner of claim 1, wherein the stator yoke further comprises a cylindrical central hole being concentric with the rotating shaft and having a screw groove on an inner circumferential surface such that the radial bearing screws into the screw groove.

6. The polygon mirror scanner of claim 5, wherein the radial bearing further comprises a screw groove so as to screw into the screw groove of the inner circumferential surface of the cylindrical central hole.

7. The polygon mirror scanner of claim 1, further comprising:
   a standard portion comprising a control base plate having a standard surface, wherein the standard portion is configured to vertically stabilize the radial bearing using the standard surface of the control base plate.

8. The polygon mirror scanner of claim 7, wherein a surface of the cylindrical central hole serves as the standard surface of the standard portion.

9. The polygon mirror scanner of claim 7, wherein the radial bearing has a collar on a peripheral surface thereof serving as the standard surface of the standard portion.

10. The polygon mirror scanner of claim 9, wherein the radial bearing comprises a collar on a bottom peripheral surface thereof in a circumferential direction thereof.

11. The polygon mirror scanner of claim 7, wherein a bottom surface of the cylindrical central hole of the stator yoke serves as the standard surface of the standard portion.

12. The polygon mirror scanner of claim 1, wherein the stator yoke comprises a collar on an inner circumferential surface thereof in a circumferential direction thereof.

13. The polygon mirror scanner of claim 1, wherein the radial bearing and the thrust bearing are each individually and separately detachable from the stator yoke.

14. A bearing device, having a convex cylindrical shape, comprises:
   a stator yoke having a cylindrical central hole concentrically and axially with a rotating shaft and forming a circumferential bearing building screw on top and a thrust groove on the bottom,
   a radial bearing, having a cylindrical central hole concentrically and axially with the rotating shaft and forming a circumferential bearing screw on a peripheral surface thereof on top and a building groove on a top surface thereof, and
   a thrust bearing fixed on the thrust groove, wherein the radial bearing is inserted into the cylindrical central hole in the stator yoke, the radial bearing is attached to the cylindrical bearing building screw, and the building groove on the top surface of the radial bearing is a tool groove when the radial bearing is attached to the circumferential screw, and, when the screws formed on the radial bearing are attached to the screw formed on the stator yoke, the radial bearing is easily detachable from the stator yoke, wherein the bearing device is configured to be used in a scanner comprising a polygon mirror.

15. The bearing device of claim 14, further comprising the radial bearing being configured to contact a bearing stopper, allowing the radial bearing to be vertically fixed to a control base plate.

16. The bearing device of claim 14, further comprising a standard portion comprising the control base plate having a standard surface, wherein the standard portion is configured to vertically stabilize the radial bearing using the standard surface of the control base plate.

17. The bearing device of claim 16, wherein the surface of the cylindrical central hole serves as the standard surface of the standard portion.

18. The bearing device of claim 16, wherein the radial bearing has a collar on a peripheral surface thereof serving as the standard surface of the standard portion.

19. A polygon mirror scanner, comprising:
   a rotor comprising a rotating shaft, a polygon mirror, and a magnet;
   a bearing device configured to rotatably support the rotor, the bearing device comprising a radial bearing, a thrust bearing, and a stator yoke;
   a stator comprising a coil facing the magnet; and
   means for separately and individually replacing or detaching the radial or thrust bearings from the polygon mirror scanner.

20. A polygon mirror scanner, comprising:
   a rotor having a rotating shaft, a polygon mirror, and a magnet;
   a bearing device configured to rotatably support the rotor, the bearing device comprising a radial bearing, a thrust bearing, a stator yoke, and a fixing member removably fixed to the stator yoke; and
   a stator comprising a coil facing the magnet, wherein the radial or thrust bearings are each individually replaceable or removable from the bearing device by removing the fixing member from the stator yoke.

* * * * *